Dec. 25, 1923.

F. W. LANCHESTER 1,478,966

CONTROL MECHANISM OF POWER PROPELLED VEHICLES

Filed Nov. 27, 1922     4 Sheets-Sheet 1

Inventor
F. W. Lanchester,
By Marks Clerk
Attys

Dec. 25, 1923.  1,478,966
F. W. LANCHESTER
CONTROL MECHANISM OF POWER PROPELLED VEHICLES
Filed Nov. 27, 1922   4 Sheets-Sheet 2

Inventor
F. W. Lanchester
By Marks & Clerk Attys.

Dec. 25, 1923.

F. W. LANCHESTER 1,478,966

CONTROL MECHANISM OF POWER PROPELLED VEHICLES

Filed Nov. 27, 1922  4 Sheets-Sheet 4

Inventor
F. W. Lanchester
By Marks & Clerk
Attys.

Patented Dec. 25, 1923.

1,478,966

UNITED STATES PATENT OFFICE.

FREDERICK WILLIAM LANCHESTER, OF LONDON, ENGLAND.

CONTROL MECHANISM OF POWER-PROPELLED VEHICLES.

Application filed November 27, 1922. Serial No. 603,710.

*To all whom it may concern:*

Be it known that I, FREDERICK WILLIAM LANCHESTER, a subject of the King of Great Britain and Ireland, and residing at 41 Bedford Square, London, W. C. 1, England, have invented certain new and useful Improvements in Control Mechanism of Power-Propelled Vehicles (for which I have filed applications in Great Britain, Nos. 31,610, Nov. 25, 1921, and 85, Jan. 3, 1922), of which the following is a specification.

The present invention relates to improvements in transmission control mechanism or transmission and brake control mechanism of power propelled vehicles, and more particularly to mechanism of the type described in British Patent No. 166,017 already granted to the present applicant.

The invention has for its object to provide improved means for bringing into and out of engagement the frictional driving and/or braking surfaces.

This invention consists in transmission control mechanism for power propelled vehicles wherein in order to constrain movement of the driving wheel axes to a definite curved path, the vehicle driving wheels together with the friction drums connected mechanically thereto are supported in bearing housings which incorporate radial arms or eccentrics.

The invention also consists in transmission control mechanism or transmission and brake control mechanism of power propelled vehicles, substantially as herein described with reference to the accompanying drawings.

Referring to the accompanying diagrammatic drawings:—

Figure 3:
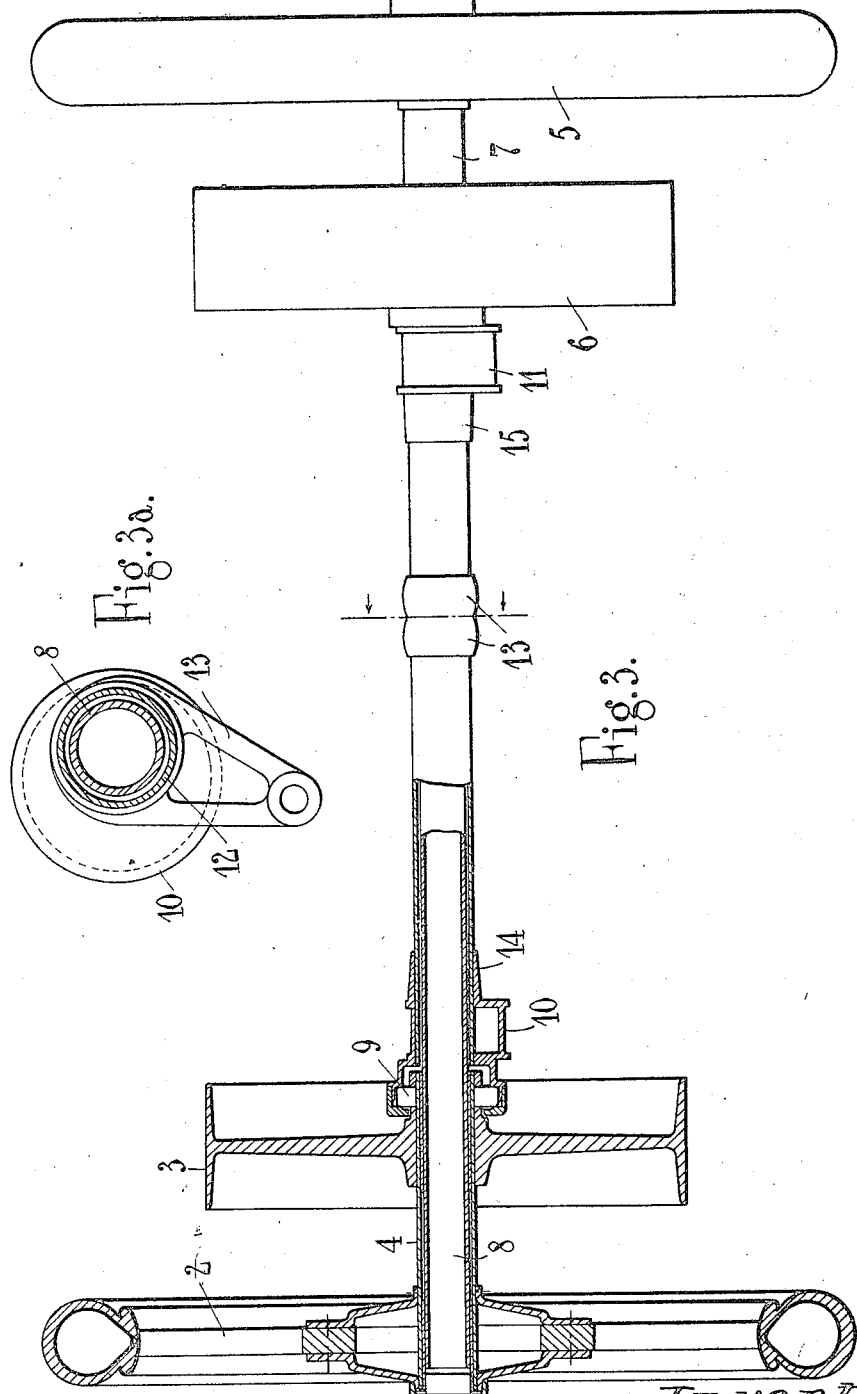
Figure 3 is an elevational view of a modified axle assemblage.
Figure 4:
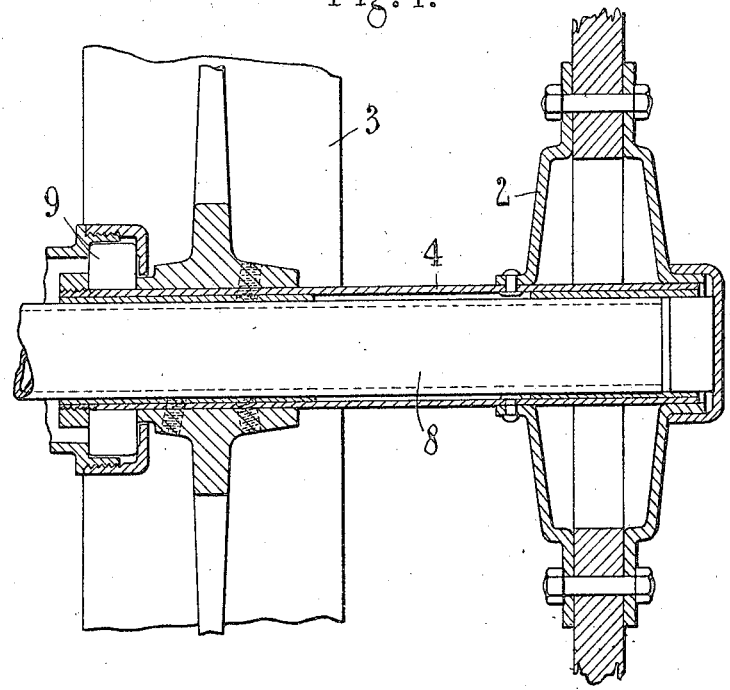
Figure 5:
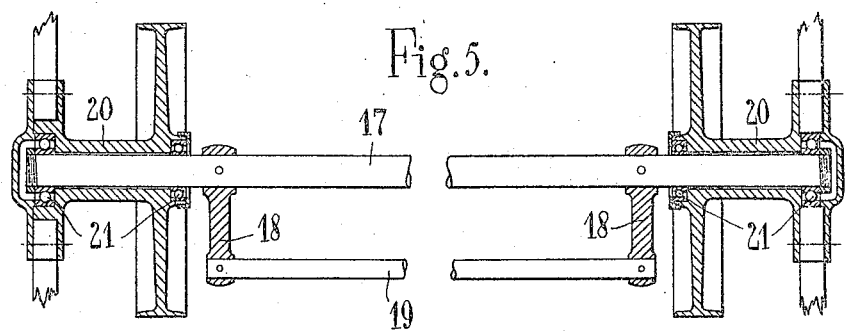
Figure 6:
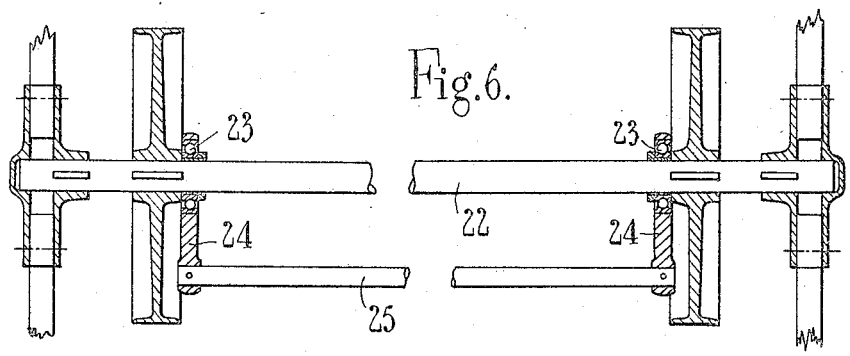

Figure 3ª is a cross-sectional view through the actuating arm axle housing of Figure 3;

Figure 4 is an enlarged sectional view corresponding to Figure 3, showing one road wheel and friction drum and associated parts;

Figures 5 and 6 represent diagrammatic views of modified means of supporting the wheels and friction drums.

In carrying the present invention into effect in one form, as applied to transmission and brake mechanism of the type described in the specification of British Letters Patent No. 166,017, the idle pulleys therein described are replaced by radial arms arranged to control the axle bearings, the said radial arms being conveniently mounted at or near the extremities of a transverse tube or shaft carried by the inner box-frame plates or members.

Figure 1:
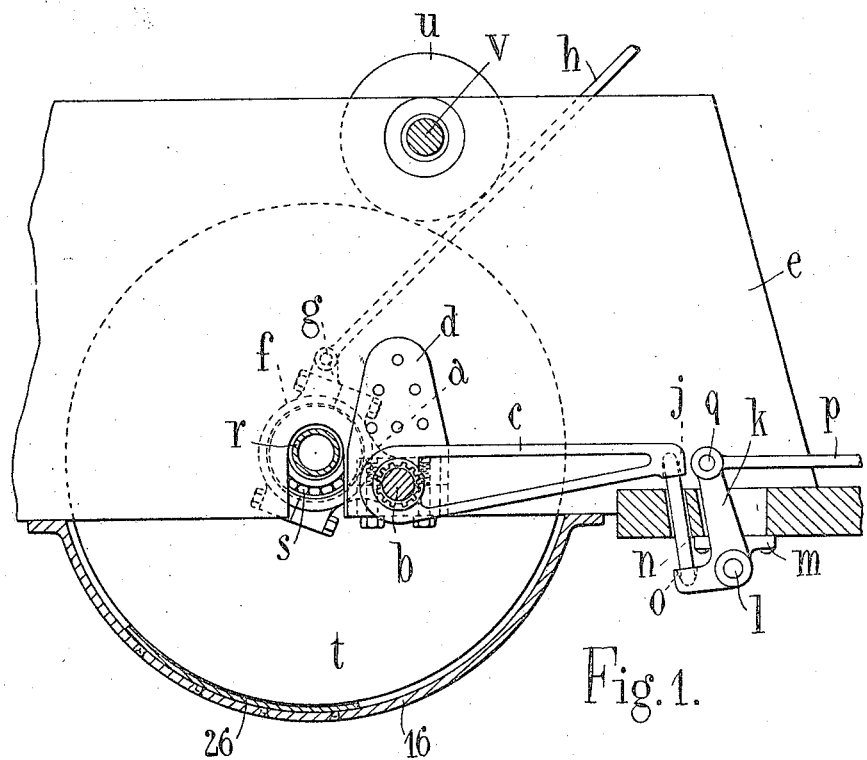
Figure 1 illustrates a vertical sectional view of one constructional example according to the present invention.
Figure 2:
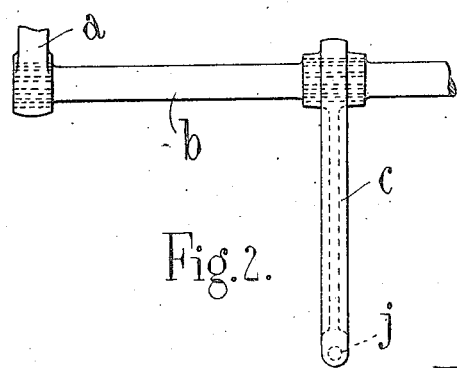
Figure 2 is a fragmental plan view of the cross-shaft of Figure 1.

According to one arrangement, illustrated by way of example in Figure 1, the radial arms $a$ are secured to a cross-shaft $b$ which is carried in journals in the castings $d$ attached to the side plate of the box-frame of the vehicle; the shaft $b$ is furnished at its centre with an enlarged splined portion to which a correspondingly splined boss of the actuating lever $c$ is secured (Figure 2); the radial arms (one only $a$ of which is shown) are similarly secured to the ends of the cross-shaft $b$ so that the lever $c$ and arms $a$ are rotationally rigid. Each arm $a$ incorporates a split bearing housing, the removable bridge-piece $f$ of which bears a lug $g$ to which is attached a tension bar $h$ acted upon by a spring (not shown) whose tension may be adjusted.

The end of the lever $c$ remote from the shaft $b$ bears a cupped depression $j$ which corresponds to a similar depression $o$ in one arm of a bell-crank lever $k$ pivoted at $l$ in a bracket $m$ secured to the vehicle chassis. A thrust bar $n$ rests between the depressions $j$ and $o$ and serves to complete the mechanical system, converting a pull upon the rod $p$ (pivoted at $q$ to the other end of the bell-crank lever) into a counter-clockwise partial rotation of shaft $b$. The vehicle wheel and friction drum assemblages are carried in bearings $s$, a floating hollow shaft $r$ extending within the two assemblages and serving to take care of bending stresses. Friction driving spools $u$ are mounted upon a shaft or shafts $v$ carried rigidly in relation to the box-frame of the vehicle.

Beneath the drum $t$ is a protecting casing 16 to which is secured a braking surface 26 for engagement by the drum when the latter is rocked to a sufficient extent. A similar friction surface is provided adjacent the other friction drum (not shown).

According to the modification illustrated in Figures 3, 3ª and 4, the assemblage comprising the road wheel 2, friction drum 3 and short length of tube 4 is mounted in a bearing 9 and the other wheel and drum, 5 and 6 respectively, and tube 7 are mounted in a similar bearing at the other side of the vehicle. The tubes 4 and 7 are retained in alignment by means of a floating hollow tubular axle 8 extending from side to side of the vehicle.

The bearing 9 is carried in a member 13 which incorporates an eccentric portion 10 and the bearing of the other assemblage is similarly carried by a member 15 bearing an eccentric portion 11. These members 14 and 15 are rigid with a tube 12 which contains the floating axle 8. Rigid upon the tube or casing member 12 are two arms 13 (Figure 3) which enable partial rotation of the casing within the housings of bearings 10 and 11 to be effected. The axis of the bearing housings thus constitutes the pivoting axis of the road wheels and friction drums and enables the latter to be brought into and out of engagement with friction pulleys on a driving shaft or shafts and into engagement with braking surfaces, preferably against the action of a spring, by actuating the free end of either of the arms 13. The two arms 13 are provided to allow of operation from two alternative sources, e. g., a pedal and a hand lever or two pedals.

In the examples of construction described above the driving and friction wheel assemblages are independently supported in bearings and are retained in alignment by a floating axle, thus permitting differential rotation between the two assemblages.

It is, however, not essential to utilize a floating axle; for example, I may employ a cross-shaft which is mounted upon eccentric bearings or upon radial arms, and carry each assemblage upon bearings on the cross-shaft.

An example of such an arrangement is illustrated in Figure 5, in which 17 represents a cross-shaft carried rigidly upon radial arms 18 pivoted about the axis of a supporting rod 19. The wheel assemblages are represented by 20 and the bearings thereof by 21, If differential action between the wheel assemblages be dispensed with, then the wheels and drums may be mounted rigidly upon a cross-shaft, as is indicated in Figure 6 wherein the cross-shaft 22 carrying rigidly the wheels and drums is supported in bearings 23 in radial arms 24 themselves rigidly carried upon a pivoting spindle 25.

Having now described my invention, what I claim as new and desire to secure by Letters Patent is:—

1. Transmission control mechanism for power propelled vehicles including in combination an axle, two vehicle road wheels mounted thereon, a friction drum rotationally rigid with each of said wheels, bearing housings for the said wheels and axle, supporting means for said housings serving to constrain movement of the wheel axis to a cylindrical path, friction driving wheels, braking surfaces engageable with said drums and means for enabling the supporting means for said housings to be actuated so that:—(1) the said friction driving wheels may be lowered into frictional driving contact with said friction drums, a component of the weight of the vehicle being employed to supply a part of the frictional driving adhesive, or (2) the friction driving wheels may be raised into free position, or (3) the braking surfaces may be raised into frictional contact with said drums at the will of the operator.

2. Transmission control mechanism for power propelled vehicles including in combination a floating axle, a vehicle road wheel loosely mounted thereon, a friction drum rotationally rigid with said vehicle road wheel, a second vehicle road wheel also loosely mounted upon said floating axle, a second friction drum rotationally rigid with said second vehicle road wheel, bearing housings for said wheels and axle, supporting means for said housings serving to constrain movement of the wheel axis to a cylindrical path, friction driving wheels, braking surfaces engageable with said drums and means for enabling the supporting means for said housings to be actuated so that:—(1) the said friction driving wheels may be lowered into frictional driving contact with said friction drums, a component of the weight of the vehicle being employed to supply a part of the frictional driving adhesive, or (2) the friction driving wheels may be raised into free position, or (3) the braking surfaces may be raised into frictional contact with said drums at the will of the operator.

3. Transmission control mechanism for power propelled vehicles including in combination an axle, two vehicle road wheels, a friction drum rotationally rigid with each of said wheels, bearing housings for said wheels and axle, eccentric mountings for said housings serving to constrain movement of the wheel axis to a cylindrical path, a friction driving wheel and a braking surface, engageable with each of said drums and means for enabling the eccentric mountings for said housings to be actuated so that;— (1) the said friction driving wheels may be lowered into frictional driving contact with said friction drums, a component of the weight of the vehicle being employed to supply a part of the frictional driving adhesive, or (2) the friction driving wheels may be raised into free position, or (3) the braking surfaces may be raised into frictional contact with said drums at the will of the operator.

4. Transmission control mechanism for power propelled vehicles including in combination an axle, two vehicle road wheels mounted thereon, a friction drum fixed to rotate with each of said wheels, bearing housings for said wheels and axle, supporting means for said housings serving to constrain movement of the wheel axis to a cylindrical path, friction driving wheels arranged above said axle and adapted to place a portion of the weight of the vehicle on said drums when the supporting means is moved in one direction, braking surfaces arranged below and engageable with said drums when the supporting means is moved in an opposite direction, and means for operating said supporting means.

In testimony whereof I have signed my name to this specification.

FREDERICK WILLIAM LANCHESTER.